(12) United States Patent
Arora et al.

(10) Patent No.: US 10,894,922 B2
(45) Date of Patent: Jan. 19, 2021

(54) PROCESSING VACUUM RESIDUUM AND VACUUM GAS OIL IN EBULLATED BED REACTOR SYSTEMS

(71) Applicant: Lummus Technology Inc., Bloomfield, NJ (US)

(72) Inventors: Arun Arora, Edison, NJ (US); Marvin I. Greene, Clifton, NJ (US)

(73) Assignee: Lummus Technology Inc., Bloomfield, NJ (US)

( * ) Notice: Subject to any disclaimer, the term of this patent is extended or adjusted under 35 U.S.C. 154(b) by 0 days.

(21) Appl. No.: 16/263,956

(22) Filed: Jan. 31, 2019

(65) Prior Publication Data
US 2019/0249095 A1  Aug. 15, 2019

Related U.S. Application Data

(62) Division of application No. 14/179,083, filed on Feb. 12, 2014, now Pat. No. 10,208,261.

(51) Int. Cl.
*B01J 8/20* (2006.01)
*C10G 65/12* (2006.01)
(Continued)

(52) U.S. Cl.
CPC .............. *C10G 65/12* (2013.01); *B01J 8/20* (2013.01); *B01J 8/222* (2013.01); *B01J 8/226* (2013.01);
(Continued)

(58) Field of Classification Search
None
See application file for complete search history.

(56) References Cited

U.S. PATENT DOCUMENTS

| 2,160,163 A | 5/1939 | Nichols |
| 4,612,108 A | 9/1986 | Angevine et al. |

(Continued)

FOREIGN PATENT DOCUMENTS

| GB | 966915 A | * | 8/1964 | ............... B01J 8/22 |
| KZ | 24301 B | | 7/2011 | |

(Continued)

OTHER PUBLICATIONS

International Search Report issued in corresponding International Application No. PCT/US2015/014235 dated May 21, 2015 (6 pages).

(Continued)

*Primary Examiner* — Jennifer A Leung
(74) *Attorney, Agent, or Firm* — Osha Bergman Watanabe & Burton LLP

(57) ABSTRACT

A process for upgrading vacuum residuum and vacuum gas oil hydrocarbons is disclosed. The process may include: contacting a heavy distillate hydrocarbon fraction and hydrogen with a zeolite selective hydrocracking catalyst in a first ebullated bed hydrocracking reaction zone to convert at least a portion of the vacuum gas oil to lighter hydrocarbons. Contacting a residuum hydrocarbon fraction and hydrogen with a non-zeolite base metal hydroconversion catalyst in a second ebullated bed hydroconversion reaction zone may produce a vapor stream containing unconverted hydrogen, acid gases and volatilized hydrocarbons which may be fed along with the vacuum gas oil in the first ebullated bed hydrocracking zone.

10 Claims, 1 Drawing Sheet

(51) Int. Cl.
*C10G 67/06* (2006.01)
*C10G 1/00* (2006.01)
*C10G 47/20* (2006.01)
*C10G 65/10* (2006.01)
*C10G 47/14* (2006.01)
*C10G 3/00* (2006.01)
*B01J 8/22* (2006.01)

(52) U.S. Cl.
CPC .............. *C10G 1/002* (2013.01); *C10G 3/49* (2013.01); *C10G 47/14* (2013.01); *C10G 47/20* (2013.01); *C10G 65/10* (2013.01); *C10G 67/06* (2013.01); *C10G 2300/1003* (2013.01); *C10G 2300/1011* (2013.01); *C10G 2300/1074* (2013.01); *C10G 2300/1077* (2013.01); *C10G 2300/205* (2013.01); *C10G 2300/301* (2013.01); *Y02P 30/20* (2015.11)

(56) References Cited

U.S. PATENT DOCUMENTS

| | | | |
|---|---|---|---|
| 4,952,306 | A | 8/1990 | Sawyer et al. |
| 5,069,890 | A | 12/1991 | Dai et al. |
| 5,073,530 | A | 12/1991 | Bezman et al. |
| 5,084,079 | A | 1/1992 | Frohnert et al. |
| 5,108,580 | A | 4/1992 | Nongbri et al. |
| 5,141,909 | A | 8/1992 | Bezman |
| 5,277,793 | A | 1/1994 | Bezman et al. |
| 5,340,563 | A | 8/1994 | Zones et al. |
| 5,366,615 | A | 11/1994 | Bezman |
| 5,866,501 | A | 2/1999 | Pradhan et al. |
| 5,935,418 | A | 8/1999 | Chakrabarty et al. |
| 5,954,944 | A | 9/1999 | Zhang et al. |
| 6,153,087 | A | 11/2000 | Bigeard et al. |
| 6,239,321 | B1 | 5/2001 | Mossman et al. |
| 6,436,279 | B1 | 8/2002 | Colyar |
| 6,447,671 | B1 | 9/2002 | Morel et al. |
| 6,454,932 | B1 * | 9/2002 | Baldassari .............. C10G 65/10 208/153 |
| 6,514,403 | B1 | 2/2003 | Louie et al. |
| 6,547,956 | B1 | 4/2003 | Mukherjee et al. |
| 6,660,157 | B2 | 12/2003 | Que et al. |
| 6,709,571 | B1 | 3/2004 | Del Rossi et al. |
| 6,712,955 | B1 | 3/2004 | Hou et al. |
| 6,726,832 | B1 * | 4/2004 | Baldassari .............. C10G 65/10 208/153 |
| 6,860,986 | B2 | 3/2005 | Timken et al. |
| 7,238,276 | B2 | 7/2007 | Fang et al. |
| 7,238,277 | B2 | 7/2007 | Dahlberg et al. |
| 7,713,407 | B2 | 5/2010 | Tracy, III et al. |
| 7,820,135 | B2 | 10/2010 | Bhattacharyya et al. |
| 8,062,505 | B2 | 11/2011 | Bhattacharyya et al. |
| 8,066,867 | B2 | 11/2011 | Dziabala et al. |
| 8,110,090 | B2 | 2/2012 | Zimmerman et al. |
| 8,128,810 | B2 | 3/2012 | Bhattacharyya et al. |
| 8,277,638 | B2 | 10/2012 | Bhattacharyya et al. |
| 8,287,720 | B2 | 10/2012 | Baldassari et al. |
| 8,343,334 | B2 | 1/2013 | Koseoglu |
| 2004/0209771 | A1 | 10/2004 | Abe et al. |
| 2009/0118556 | A1 | 5/2009 | Euzen et al. |
| 2009/0288986 | A1 | 11/2009 | Colyar et al. |
| 2011/0017641 | A1 | 1/2011 | Gupta et al. |

FOREIGN PATENT DOCUMENTS

| | | |
|---|---|---|
| RU | 2481387 C2 | 5/2013 |
| WO | 2013067315 A1 | 5/2013 |

OTHER PUBLICATIONS

Written Opinion issued in corresponding International Application No. PCT/US2015/014235 dated May 21, 2015 (8 pages).
Written Opinion issued in Singapore Application No. 11201606703X; dated May 31, 2017 (5 pages).
Office Action issued in corresponding RU Application No. 2016136357/04 with English translation dated Oct. 31, 2017 (20 pages).
Seader, J. D. et al. "Absorption and Stripping" Separation Process Principles, Wiley, 2006 (9 pages).

* cited by examiner

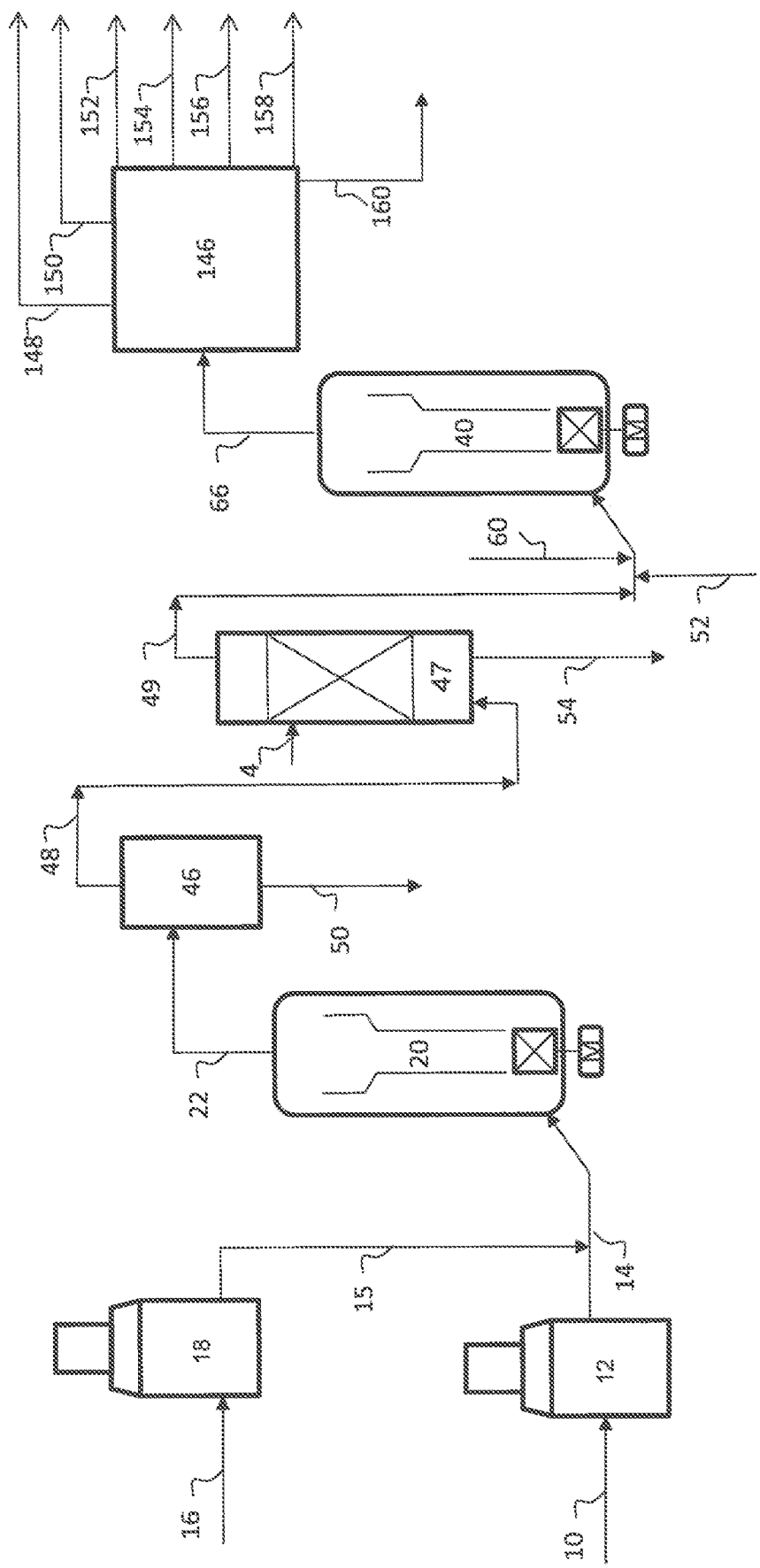

PROCESSING VACUUM RESIDUUM AND VACUUM GAS OIL IN EBULLATED BED REACTOR SYSTEMS

FIELD OF THE DISCLOSURE

Embodiments disclosed herein relate generally to hydroconversion processes, including processes for upgrading vacuum residuum, vacuum gas oil and other heavy hydrocarbon fractions. More specifically, embodiments disclosed herein relate to processing the vacuum residuum and vacuum gas oil in ebullated bed residue hydroconversion and ebullated bed hydrocracking units, respectively.

BACKGROUND

As the worldwide demand for gasoline and other distillate refinery products such as kerosene, jet and diesel has steadily increased, there has been a significant trend toward conversion of higher boiling compounds to lower boiling ones. To meet the increasing demand for distillate fuels, refiners have investigated various reactions, such as hydrocracking to convert Residuum, Vacuum Gas Oil (VGO) and other heavy petroleum feedstocks to jet and diesel fuels.

Trickle-bed, three phase reactors in which a reactor loaded with heterogeneous catalyst particles and co-fed with liquid hydrocarbons and gaseous hydrogen represent one of the key reactor types used in the petroleum refining and petrochemicals industries. The trickle-bed reactors have limitations on the rates of diffusion of the gaseous hydrogen-rich phase into the liquid hydrocarbon phase and the diffusion of the liquid hydrocarbon phase containing dissolved hydrogen into the solid catalytic phase. There are also difficulties of controlling the temperature rises, loading the catalyst, and the varying product quality as a result of continual catalyst deactivation over a cycle. There may also be fouling/plugging of the catalyst in the inlet zones, attrition of the catalyst particles due to the kinetic energies of the entering liquid and gaseous streams along with plugging of the pore mouth of the active catalyst sites.

Ebullated bed reactors are an outgrowth of the slurry hydrocracking technology for residuum feedstocks. Catalysts have been developed that exhibited excellent distillate selectivity, reasonable conversion activity and stability for heavier feedstocks. The conversion rates attainable by the various processes are limited, however. Nonetheless, economic processes to achieve high hydrocarbon conversions are desired.

SUMMARY

In one aspect, embodiments disclosed herein relate to a process for upgrading residuum hydrocarbons and heavy distillate feedstocks. The process includes contacting residuum hydrocarbons and hydrogen with a non-zeolitic base metal hydroconversion catalyst in a first ebullated bed hydroconversion reactor system to produce a first effluent. The first effluent from the first ebullated bed hydroconversion reactor is fractionated to recover a liquid product and vapor product. The vapor product and a heavy distillate feedstock are contacted with a zeolitic selective hydrocracking catalyst in a second ebullated bed hydrocracking reactor system to produce a second effluent. The second effluent from the second ebullated bed hydrocracking reactor system is recovered and fractionated to recover one or more hydrocarbon fractions.

In another aspect, embodiments disclosed herein relate to a process for upgrading heavy distillate feedstocks by contacting hydrogen and the heavy distillate feedstocks with a zeolitic selective hydrocracking catalyst in an ebullated bed hydrocracking reactor system to produce an effluent. The effluent from the ebullated bed hydrocracking reactor system is recovered and fractionated to recover one or more hydrocarbon fractions.

In another aspect, embodiments disclosed herein relate to a system for upgrading residuum hydrocarbons and heavy distillate feedstocks. The system includes a first ebullated bed hydrocracking reactor system containing a zeolitic selective hydrocracking catalyst for reacting the heavy distillate feedstock and hydrogen to produce a first effluent and a first fractionation unit to fractionate the first effluent to recover one or more hydrocarbon fractions.

Other aspects and advantages will be apparent from the following description and the appended claims.

BRIEF DESCRIPTION OF DRAWINGS

FIG. 1 is a simplified process flow diagram of a process for upgrading residuum and heavy distillate hydrocarbon feedstocks according to embodiments disclosed herein.

DETAILED DESCRIPTION

In one aspect, embodiments herein relate generally to hydroconversion processes, including processes for hydrocracking residue, vacuum gas oil and other heavy hydrocarbon fractions. More specifically, embodiments disclosed herein relate to processing a residuum hydrocarbon feedstock in a first ebullated bed hydroconversion unit containing base metal hydroconversion catalysts, separating the effluent to recover a vapor product, and processing the vapor product and vacuum gas oil in a second ebullated bed hydrocracking unit containing selective hydrocracking catalysts.

Hydroconversion processes disclosed herein may be used for reacting residuum hydrocarbon feedstocks and vacuum gas oils at conditions of elevated temperatures and pressures in the presence of hydrogen and one or more hydroconversion catalyst to convert the feedstock to lower molecular weight products with reduced contaminant (such as sulfur and/or nitrogen) levels. Hydroconversion processes may include, for example, hydrogenation, hydrodesulfurization, hydrodenitrogenation, hydrocracking, hydrodeoxygenation, hydrodemetallization, hydroDe Conradson Carbon Residue or hydrodeasphaltenization, etc.

As used herein, residuum hydrocarbon fractions, or like terms referring to residuum hydrocarbons, are defined as a hydrocarbon fraction having boiling points or a boiling range above about 340° C. but could also include whole heavy crude processing. Residuum hydrocarbon feedstocks that may be used with processes disclosed herein may include various refinery and other hydrocarbon streams such as petroleum atmospheric or vacuum residua, deasphalted oils, deasphalter pitch, hydrocracked atmospheric tower or vacuum tower bottom, fluid catalytically cracked (FCC) slurry oils, residua derived from one or more of shale-derived oils, coal-derived oils, tar sands bitumen, tall oils, bio-derived crude oils, black oils, as well as other similar hydrocarbon streams, or a combination of these, each of which may be straight run, process derived, hydrocracked, partially desulfurized, and/or partially demetallized streams. In some embodiments, residuum hydrocarbon fractions may include hydrocarbons having a normal boiling point of at least 480° C., at least 524° C., or at least 565° C. As used herein, heavy distillate feedstocks, or like terms referring to distillate hydrocarbons, are defined as a hydrocarbon fraction having boiling points or a boiling range below about 565° C. Heavy distillate feedstocks that may be used with processes disclosed herein may include various refinery and other hydrocarbon streams such as petroleum gas oils, straight run vacuum gas oils, hydrocracked vacuum gas oils, vacuum gas oils from an ebullated bed hydroconversion process, gas oils derived from one or more of shale-derived oils, coal-derived oils, tar sands bitumen, tall oils, bio-derived crude oils, black oils, as well as other similar hydrocarbon streams, or a combination of these, each of which may be straight run, process derived, hydrocracked, partially desulfurized, and/or partially demetallized streams.

Embodiments disclosed herein may utilize selective hydrocracking catalysts in distillate fed ebullated bed reactor systems to hydrocrack vacuum gas oil streams. These ebullated bed reactor systems may include selective zeolite containing hydrocracking catalysts loaded with metallic hydrogenation components. The catalysts may be designed to have good fluidization and attrition resistant properties as well as selective hydrocracking performance properties. Ebullated bed systems absorb the heat of reaction as the enthalpy of the entering gas oil streams and the ebullated bed operates essentially at isothermal conditions due to enhanced heat (and mass) transfer provided by the energy of the ebullating pumps. An allowable temperature spread between the gas oil stream feed and the isothermal ebullated bed temperature may range from about 50 to about 150° C., from about 75 to about 125° C., or from about 90 to about 100° C. Furthermore, the ebullated bed reactor is able to operate at substantially uniform catalyst temperatures throughout the operating cycle, unlike that of typical fixed-bed hydrocracking reactors.

In some embodiments, an upstream resid-fed ebullated bed hydroconversion reactor system may produce a high temperature/high pressure vapor stream which may be fed to the distillate-fed ebullated bed hydrocracking system. In alternate embodiments, multiple ebullated bed systems may feed a common product recovery system.

In some embodiments, the ebullated bed selective hydrocracking system provides for the removal of exothermic heats of hydrogenation without the need for recompressing and recirculating hydrogen rich-gas for use as cold quench like that practiced in trickle-bed hydrocracker reactors. The ebullated bed selective hydrocracking system may also use fluidizable and attrition resistant selective hydrocracking catalysts.

Embodiments herein relate generally to a process for upgrading residuum hydrocarbons and heavy distillate feedstocks. The process may include contacting residuum hydrocarbons and hydrogen with a non-zeolitic base metal hydroconversion catalyst in a first ebullated bed hydroconversion reactor system to produce a first effluent. The first effluent from the first ebullated bed hydroconversion reactor may be fractionated to recover a liquid product and vapor product. The vapor product and the heavy distillate feedstocks may be contacted with a zeolitic selective hydrocracking catalyst in a second ebullated bed hydrocracking reactor system to produce a second effluent. The second effluent may be recovered from the second ebullated bed hydrocracking reactor system and fractionated to recover one or more hydrocarbon fractions. In another embodiment, the recovered vapor product can be processed in an absorption column to remove the middle distillate products prior to further processing in the second ebullated bed hydrocracking reactor system.

In some embodiments, a process for upgrading heavy distillate feedstocks is described, the process may include contacting hydrogen and the heavy distillate feedstocks with a zeolitic selective hydrocracking catalyst in an ebullated bed hydrocracking reactor system to produce an effluent. The effluent from the ebullated bed hydrocracking reactor system may be recovered and fractionated to recover one or more hydrocarbon fractions. In other embodiments, a residuum hydrocarbon feedstock and hydrogen may be contacted with a non-zeolitic base metal hydroconversion catalyst in a second ebullated bed hydroconversion reactor system to produce a second effluent which may be fractionated to recover a liquid product and vapor product. The vapor product may be fed to the ebullated bed hydrocracking reactor system along with the hydrogen and heavy distillate.

Referring now to FIG. 1, a residuum hydrocarbon 10, such as residuum, is fed to a heater 12. In heater 12, the residuum hydrocarbon is heated to produce a heated residuum hydrocarbon fraction 14 having a temperature ranging from 250 to about 360° C. A hydrogen stream 16 may be fed to a heater 18 to produce a heated hydrogen stream 15 having a temperature ranging from 250 to about 520° C. In some embodiments, a single heater may be used but separate coils may be necessary. The heated residuum hydrocarbon fraction 14 and the heated hydrogen stream 15 are combined and may be fed to a first ebullated bed hydroconversion reactor system 20, which may include one or more ebullated bed hydroconversion reactors, where the hydrocarbons and hydrogen are contacted with a hydroconversion catalyst to react at least a portion of the residuum hydrocarbon with hydrogen to form lighter hydrocarbons, demetallize the pitch hydrocarbons, remove Conradson Carbon Residue, or otherwise convert the residuum to useful products.

Reactors in the first ebullated bed hydroconversion reactor system 20 may be operated at temperatures in the range from about 200 to about 600° C., from about 300 to about 500° C., from about 350 to about 475° C., and from about 380° C. to about 450° C., hydrogen partial pressures in the range from about 5 to about 250 bara, from about 25 to about 200 bara, from about 50 to about 175 bara, and from about 70 bara to about 150 bara, and liquid hourly space velocities (LHSV) in the range from about 0.1 to about 5, from about 0.15 to about 3 and from about 0.2 $h^{-1}$ to about 2.0 $h^{-1}$. Within the ebullated hydroconversion bed reactors, the catalyst may be back mixed and maintained in random motion by the recirculation of the liquid product. This may be accomplished by first separating the recirculated oil from the gaseous products. The oil may then be recirculated by means of an external pump, or, as illustrated, by a pump having an impeller mounted in the bottom head of the reactor.

In the ebullated bed hydroconversion reactor systems, the catalysts are submerged in liquid and are constantly moving and colliding with each other. The movement of the catalysts provides the external surfaces of the catalyst to become available to the reacting liquid in which they are suspended. The ebullated bed hydroconversion reactor systems may operate near isothermal reaction temperatures. Isothermal reaction temperatures may lead to higher selectivities for middle distillate products.

Target conversions in the first ebullated bed hydroconversion reactor system 20 may be at least about 50%, at least 60%, or at least about 70%, depending upon the feedstock being processed. In any event, target conversions should be maintained below the level where sediment formation becomes excessive and thereby prevents continuity of operations. Conversion may be defined as the disappearance of materials boiling higher than at least 480° C., or at least 524° C., or at least 565° C., in an ASTM D1160 distillation for heavy hydrocarbon mixtures. In addition to converting the residuum hydrocarbons to lighter hydrocarbons, sulfur removal may be in the range from about 40 wt % to about 80 wt %, metals removal may be in the range from about 60 wt % to about 85 wt %, and Conradson Carbon Residue (CCR) removal may be in the range from about 30 wt % to about 65 wt %.

Non-zeolitic hydroconversion catalyst compositions that may be used in the first ebullated bed hydroconversion system 20 according to embodiments disclosed herein are well known to those skilled in the art and several are commercially available from W.R. Grace & Co., Criterion Catalysts & Technologies, and Albemarle, among others. Suitable non-zeolitic hydroconversion catalysts may include one or more elements selected from Groups 4-12 of the Periodic Table of the Elements. In some embodiments, non-zeolitic hydroconversion catalysts according to embodiments disclosed herein may comprise, consist of, or consist essentially of one or more of nickel, cobalt, tungsten, molybdenum and combinations thereof, either unsupported or supported on a porous substrate such as silica, alumina, titania, or combinations thereof. As supplied from a manufacturer or as resulting from a regeneration process, the non-zeolitic hydroconversion catalysts may be in the form of metal oxides, for example. In some embodiments, the non-zeolitic hydroconversion catalysts may be pre-sulfided and/or pre-conditioned prior to introduction to the ebullated bed hydroconversion reactor(s).

Following conversion in the first ebullated bed hydroconversion reactor system 20, the partially converted hydrocarbons may be recovered via flow line 22 as a mixed vapor/liquid effluent and fed to a fractionation system 46 to recover one or more hydrocarbon fractions. The partially converted hydrocarbon in flow line 22 may be a mixture of hydrogen, hydrogen sulfide and other acid gases and a wide range of hydrocracked hydrocarbons including naphtha, kerosene, jet, diesel and gasoil range materials. As illustrated, fractionation system 46 may be used to recover a vapor fraction 48 containing unconverted hydrogen, acid gases and volatilized hydrocarbons and a liquid product 50. In some embodiments, the liquid product 50 may be recycled for further processing, such as to the first ebullated bed hydroconversion reactor system 20, or other reaction units. In other embodiments, liquid product 50 may be blended with a cutter fraction to produce a fuel oil.

Fractionation system 46 may include, for example, a high pressure high temperature (HP/HT) separator to separate the effluent vapor from the effluent liquids. The separated vapor may be routed through gas cooling, purification, and recycle gas compression, or, as illustrated, may be first processed through an absorption tower 47 to remove middle distillate products prior to being fed to the second ebullated bed hydrocracking reactor containing selective zeolitic hydrocracking catalysts.

The separated liquid product 50 from the HP/HT separator may be flashed and routed to an atmospheric distillation system (not shown) along with other distillate products recovered from the gas cooling and purification section. The atmospheric tower bottoms, such as hydrocarbons having an initial boiling point of at least about 340° C., such as an initial boiling point in the range from about 340° C. to about 427° C., may then be further processed through a vacuum distillation system to recover vacuum distillates.

As shown in FIG. 1, the vapor fraction 48 is sent to an absorption tower 47 where it may be contacted in counter current fashion with a gas oil-containing stream 4 to absorb middle distillate products produced in first ebullated-bed reactor hydroconversion system 20 and contained in vapor fraction 48. A second vapor stream 49 is generated which may be lean in middle distillate content. A middle distillate enriched gas oil stream 54 may be sent to downstream fractionation wherein the middle distillates may be recovered as products and the gas oil-containing stream may be recycled and blended into gas oil-containing stream 4. The absorption tower 47 may be any type of mass transfer device including, but not limited to, packed beds, spray towers, tray towers, Scheibel columns, microchannel contactors.

Second vapor stream 49 is mixed with a heavy distillate feedstock 52, such as vacuum gas oil (VGO), and fed to a second ebullated bed hydrocracking reactor system 40, which may include one or more ebullated bed hydrocracking reactors, where the heavy distillate feedstock 52 and hydrogen are contacted with a selective hydrocracking catalyst to hydrocrack at least a portion of the heavy distillate feedstock 52 with hydrogen to form middle distillate and lighter hydrocarbons, or otherwise convert the heavy distillate feedstock to useful products. By using the hydrogen in the vapor fraction 49, a separate hydrogen compression loop may be avoided. In some embodiments, additional hydrogen may be fed, as necessary, via stream 60, which may be combined with the vapor fraction 49 and heavy distillate feedstock 52. In some embodiments, the vapor fraction 49 may maintain the partial pressure in the inlet to the second ebullated hydrocracking bed reactor system 40 in a range from about 134 to about 141 bara H2. In some embodiments, additional hydrogen can be provided to the second ebullated bed hydrocracking reactor system 40 which may support higher throughput of heavy distillate feedstock 52. In some embodiments, excess hydrogen may be fed to the first ebullated bed hydroconversion reactor system 20 and carried through the process to the second ebullated bed hydrocracking reactor system 40. By utilizing the vapor fraction 48 in the second ebullated bed reactor system 40 to provide the hydrogen requirement, a synergism is provided of being able to co-hydrocrack over selective zeolitic based hydrocracking catalysts both the heavy distillate feedstock 52 and the hydrocracked hydrocarbons including gasoil range materials from the first ebullated bed system 20 in the vapor fraction 49.

Reactors in the second ebullated bed hydrocracking reactor system 40 may be operated at temperatures in the range from about 200° C. to about 550° C., from about 300° C. to about 500° C., from about 350° C. to about 475° C. and from about 380° C. to about 430° C., hydrogen partial pressures in the range from about 5 to about 300 bara, from about 25 to about 250 bara, from about 50 to about 200 bara, and from about 70 bara to about 175 bara, and liquid hourly space velocities (LHSV) in the range from about 0.1 to about 4, from about 0.15 to about 3 and from about 0.2 $h^{-1}$ to about 2.0 $h^{-1}$. In some embodiments, the hydrogen partial pressures in the second ebullated bed hydrocracking reactor system 40 will be about equal to or greater than that in stream 49, depending upon the quantity of makeup hydrogen 60 as the second ebullated bed hydrocracking reactor system 40 operates under the autogeneous pressure, i.e., the pressure without any pressure letdown between ebullated bed hydroconversion reactor system 20 and ebullated bed hydrocracking reactor system 40 other than which may occur by normal flow-induced pressure drops in the piping circuit between the two reactor systems. Within the ebullated bed reactors 20 or 40, the catalyst may be back-mixed and maintained in random motion by the recirculation of the liquid product. This may be accomplished by first separating the recirculated oil from the gaseous products. The oil may then be recirculated by means of an external pump, or, as illustrated, by a pump having an impeller mounted in the bottom head of the reactor. In some embodiments, the heat of reaction is absorbed as the enthalpy of the entering heavy distillate feedstock 52 and the second ebullated bed hydrocracking reactor system 40 operate at isothermal conditions due to enhanced heat (and mass) transfer provided by the energy of the ebullating pumps.

Target conversions in the second ebullated bed hydrocracking reactor system 40 may be at least about 60%, at least about 70%, and at least about 80%, depending upon the feedstock being processed. Conversion may be defined as the formation of materials boiling less than about 370° C. in an ASTM D1160 distillation for heavy hydrocarbon mixtures. In addition to converting the heavy hydrocarbons to lighter hydrocarbons, the distillate selectivities may be defined as the liquid volume percent (lv %) of each of five defined distillate fuels ranges divided by the total liquid volume percent of the lighter hydrocarbons boiling less than about 370° C. and may consist of a jet range selectivity from about 40 to 80 liquid volume %; a diesel range selectivity from about 10 to about 35 lv %; a naphtha range selectivity from about 5 to about 18 lv %; and an LPG range selectivity from about 0.5 to about 4 lv %.

Zeolitic catalysts useful in the second ebullated bed hydrocracking reactor system 40 may include any zeolite containing catalyst useful for the hydrotreating and hydrocracking of a hydrocarbon feedstock. A zeolite containing hydrotreating catalyst, for example, may include any zeolitic catalyst composition that may be used to catalyze the hydrogenation of hydrocarbon feedstocks to increase its hydrogen content and/or remove heteroatom contaminants. A zeolitic hydrocracking catalyst, for example, may include any zeolitic catalyst composition that may be used to catalyze the addition of hydrogen to large or complex hydrocarbon molecules as well as the cracking of the molecules to obtain smaller, lower molecular weight molecules.

Zeolite containing hydrotreating and hydrocracking catalyst compositions for use in the gas oil hydrocracking process according to embodiments disclosed herein are well known to those skilled in the art and several are commercially available from W.R. Grace & Co., Criterion Catalysts & Technologies, and Albemarle, among others. The availability and choice of robust, active, and selective catalysts for hydrocracking of vacuum residua vs. hydrocracking of atmospheric and vacuum distillates represents a challenging area to petroleum refiners from two viewpoints. Firstly, while most zeolite containing hydrotreating and hydrocracking catalysts have high activity and selectivity, they are not sufficiently robust and are sensitive to many hydrocarbon-containing feed contaminants that result in poisoning of their active catalyst sites. Thus, such zeolite containing hydroconversion catalysts have not been commercially used for hydroconversion of vacuum residua feedstocks, the latter of which have relatively high concentrations of catalyst poisons such as organometallics and coke precursors. While vacuum residua represent opportunity feedstocks having relatively low economic value, their hydroconversion, specifically their hydrocracking over zeolite containing catalysts, would lead to an uneconomical situation with regard to the cost of the makeup hydroconversion catalysts per barrel of vacuum residua being processed. To be able to cost effectively handle the contaminants in vacuum residua feedstocks, refiners have resorted to use of amorphous type, non-zeolitic hydroconversion catalysts which are relatively low cost and can trap much of the organometallics-derived metals and coke precursors, e.g., Conradson Carbon Residues, and thereby produce vacuum gas oils, atmospheric gas oils and middle distillates. Even with such an initial vacuum residua hydroconversion step, some vacuum gas oils, especially heavy vacuum gas oils and those derived from thermal processing units such as coker gas oils, still contain small amounts of metallic contaminants as well as coke precursors, the latter defined by their content of heavy polynuclear aromatics compounds.

Secondly, hydroprocessing of these heavy distillate feedstocks in conventional fixed bed hydrocracking reactors can still be problematic with regards to fouling/plugging of catalyst particles in the inlet zones of the reactors. The system described herein utilizes low cost amorphous type, non-zeolitic hydroconversion catalysts to hydroprocess contaminant-containing vacuum residua in a first ebullated bed hydroconversion reaction system to produce gas oil distillates, the latter of which are subsequently hydrocracked over active, selective and fluidizable zeolite-containing hydrocracking catalysts in a second ebullated bed hydrocracking reaction system wherein reaction conditions efficiently promote the desired hydrocracking reactions in a more economical manner than could be achieved in ebullated bed reaction systems utilizing non-zeolitic hydroconversion catalysts.

Suitable zeolite containing hydrocracking catalysts may include one or more elements selected from Groups 4-12 of the Periodic Table of the Elements. In some embodiments, zeolite containing hydrocracking catalysts according to embodiments disclosed herein may comprise, consist of, or consist essentially of one or more of nickel, cobalt, tungsten, molybdenum, platinum, palladium and combinations thereof, either unsupported or supported on a porous substrate such as H Y-zeolite; H ZSM-5, mordenite, erionite or ultrastable faujasite, Beta zeolite, ZSM-11, ZSM-22, ZSM-23, ZSM-35, ZSM-48, ZSM-57, ZSM-34, REY molecular sieve, REHY molecular sieve, or combinations thereof. As supplied from a manufacturer or as resulting from a regeneration process, the hydrocracking catalysts may be in the form of metal oxides, for example. Examples of suitable vacuum gas oil hydrocracking catalysts may be found in U.S. Pat. Nos. 5,073,530; 5,141,909; 5,277,793; 5,366,615; 5,340,563; 6,860,986; and 5,069,890, which are incorporated by reference herein their entirety. In some embodiments, the zeolite containing hydrocracking catalysts may be pre-sulfided and/or pre-conditioned prior to introduction to the hydrocracking reactor(s). In some embodiments, the zeolite containing hydrocracking catalysts may have an economically viable attrition resistance under ebullated-bed selective hydrocracking conditions.

The second ebullated bed hydrocracking reactor system 40 may include zeolitic catalysts loaded with base metal hydrocracking catalysts having higher selectivities in the middle distillate range. The product slate from the second ebullated bed hydrocracking reactor system 40 may include from about 57 vol % jet fuel, about 20 vol % diesel, about 20 vol % naphtha and about 3 vol % liquified petroleum gas (LPG), for example.

Following conversion in the second ebullated bed hydrocracking reactor system 40, the at least partially converted hydrocarbons may be recovered via flow line 68 as a mixed vapor/liquid effluent, and sent for further product recovery.

In some embodiments, the effluent 66 may be fed to a fractionation system 146 to recover one or more hydrocarbon fractions. In some embodiments, the separated liquid product 50 may also be flashed and fed to the fractionation system 146. As illustrated, fractionation system 146 may be used to recover an offgas 148 containing light hydrocarbon gases and hydrogen sulfide (H$_2$S), a light naphtha fraction 150, a heavy naphtha fraction 152, a kerosene fraction 154, a diesel fraction 156, a light vacuum gas oil fraction 158, and a heavy gas oil fraction 160. The light vacuum gas oil fraction 158 or heavy gas oil fraction 160, such as hydrocarbons having an initial boiling point in the range from about 340° C. to about 427° C., may then be further processed through a vacuum distillation system to recover vacuum distillates.

As described above, embodiments disclosed herein effectively integrate vacuum residue hydroconversion and vacuum gas oil hydrocracking, extending the yields of hydrotreated middle distillate products above those which can be attained by residue hydroconversion alone. Further, the higher yields may be attained using less catalytic reactor volume as compared to other schemes proposed to achieve similar conversions. As a result, embodiments disclosed herein may provide comparable or higher conversions to selected products while requiring a lower capital investment. Further, embodiments disclosed herein may be used to produce a fuel oil having less than 1 wt % sulfur from a high sulfur containing residue feed while maximizing overall conversion. Embodiments may reduce hydrogen consumption and allow the addition of makeup catalyst without having to shutdown the plant, leading to longer cycle times.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A system for upgrading residuum hydrocarbons and heavy distillate feedstocks, the system comprising:
   an ebullated bed hydroconversion reactor system configured to contact residuum hydrocarbons and hydrogen with a non-zeolitic base metal hydroconversion catalyst to produce a first effluent,
   a first separation unit configured to separate the first effluent to recover a first liquid product and a first vapor product;
   an absorption tower configured to concurrently contact counter-currently the first vapor product with a hydrocarbon stream, and produce a second vapor product and a second liquid product, wherein the second vapor product is lean in middle distillate content and comprises gasoil range hydrocarbon;
   a first flowline configured to feed the first vapor product to the absorption tower;
   an ebullated bed hydrocracking reactor system configured to contact the second vapor product and a heavy distillate feedstock with a zeolitic selective hydrocracking catalyst to produce a second effluent;
   a second flowline configured to feed the second vapor product to the ebullated bed hydrocracking reactor system; and
   a third separation unit configured to separate the second effluent and recover one or more hydrocarbon fractions.

2. The system of claim 1, further comprising a heat exchange unit configured to heat residuum hydrocarbons and hydrogen prior to contact with the non-zeolitic base metal hydroconversion catalyst.

3. The system of claim 1, wherein the residuum hydrocarbons are selected from the group consisting of petroleum crudes, shale oils, tar sands bitumen, coal-derived oils, tall oils, black oils, organic wastes, biomass-derived liquids, and mixtures thereof.

4. The system of claim 1, wherein the heavy distillate feedstock is selected from the group consisting of atmospheric gas oil, light vacuum gas oil, heavy vacuum gas oil, virgin vacuum gas oil, or heavy coker gas oil, FCC cycle oil, and deasphalted oil, and mixtures thereof, wherein the heavy distillate feedstock is derivable from petroleum, bitumen, kerogen, biomass, or organic waste sources.

5. The system of claim 4, wherein the residuum hydrocarbons are derived from a crude, and wherein the heavy distillate feedstock is a virgin vacuum gas oil topped off of the crude.

6. The system of claim 1, wherein the residuum hydrocarbons comprise at least one of petroleum atmospheric or vacuum residua, deasphalted oils, deasphalter pitch, hydrocracked atmospheric tower or vacuum tower bottoms, fluid catalytically cracked (FCC) slurry oils, residuum derived from shale-derived oils, coal-derived oils, bio-derived crude oils, tar sands bitumen, tall oils, and black oils.

7. The system of claim 1, wherein the zeolitic selective hydrocracking catalyst has a substrate consisting essentially of at least one of H Y-zeolite, H ZSM-5, mordenite, erionite or ultrastable faujasite, USY zeolite, Beta zeolite, ZSM-11, ZSM-22, ZSM-23, ZSM-35, ZSM-48, ZSM-57, ZSM-34, REY molecular sieve, or REHY molecular sieve.

8. The system of claim 7, wherein the zeolitic selective hydrocracking catalyst further comprises one or more of cobalt, molybdenum, tungsten, nickel, platinum, or palladium.

9. The system of claim 1, wherein the zeolitic selective hydrocracking catalyst is manufactured to be fluidizable and have high attrition resistance under the reaction conditions in the ebullated bed hydrocracking reactor system.

10. The system of claim 9, wherein the zeolitic selective hydrocracking catalyst is comprised of a noble metal incorporated onto a zeolitic support.

* * * * *